(12) United States Patent
Chung et al.

(10) Patent No.: US 7,291,027 B1
(45) Date of Patent: Nov. 6, 2007

(54) EXTERNAL BOX FOR HARD DISK DRIVES WITH QUICK RELEASE MECHANISM

(75) Inventors: Ming-Tsai Chung, Taipei (TW); Ah-Jee Wang, Taipei (TW)

(73) Assignee: D-Link Corporation, Taipei (TW)

( * ) Notice: Subject to any disclaimer, the term of this patent is extended or adjusted under 35 U.S.C. 154(b) by 0 days.

(21) Appl. No.: 11/492,041

(22) Filed: Jul. 25, 2006

(51) Int. Cl.
*H01R 13/62* (2006.01)

(52) U.S. Cl. ........................... 439/160; 439/500
(58) Field of Classification Search ............ 439/160, 439/152, 159, 500, 157
See application file for complete search history.

(56) References Cited

U.S. PATENT DOCUMENTS

| | | | |
|---|---|---|---|
| 3,193,790 A | * | 7/1965 | Boyle et al. ............... 439/160 |
| 4,031,295 A | * | 6/1977 | Rigazio ...................... 429/100 |
| 7,004,772 B1 | * | 2/2006 | Hsiao et al. ................ 439/160 |
| 2006/0178040 A1 | * | 8/2006 | Kurosawa ................... 439/500 |
| 2006/0211297 A1 | * | 9/2006 | Mizuguchi .................. 439/500 |

* cited by examiner

*Primary Examiner*—Hien Vu
(74) *Attorney, Agent, or Firm*—Bacon & Thomas, PLLC

(57) ABSTRACT

The present invention is to provide an external box comprising a panel, a housing, a seat, and a body, wherein the panel is secured to a rear of the housing, the seat is secured to a front of the housing, and the body is secured to the seat. The housing contains at least one mass storage device each adapted to connect to a corresponding port mounted on the seat. The body comprises at least one pivotal release mechanism each lined up with the mass storage device. The release mechanism is adapted to pivot to pass a channel of the seat to push the mass storage device in the housing further away from of a rear of the body for detaching the mass storage device from the external box by utilizing the principles of lever. By utilizing this external box, the purpose of quickly easily removing the mass storage device is achieved.

10 Claims, 3 Drawing Sheets

EXTERNAL BOX FOR HARD DISK DRIVES WITH QUICK RELEASE MECHANISM

FIELD OF THE INVENTION

The present invention relates to hard disk drive release mechanisms, and more particularly to an external box contained at least one hard disk drive and incorporating a lever-based release mechanism capable of removing any hard disk drive in a quick, easy manner.

BACKGROUND OF THE INVENTION

The world has entered into a new era with information technology being progressed rapidly. All kinds of information products and peripheral devices (e.g., notebook computers, personal computers, servers, external boxes for HDDs (hard disk drives) MP3s, mobile phones, PDAs (Personal Digital Assistants), digital cameras, etc.) are commercially available in a faster pace. The trend of developing the above products is slimness, compactness, and lightweight in consideration of weight and size. Therefore, people are more willing to buy and use such portable electronic products in their work and daily life. In another aspect, people have an increasing demand to the features and quality of the portable electronic products. These portable electronic products not only increase the speed and efficiency of information communication but also bring a lot of convenience to our daily life and work.

Currently, some electronics manufacturers spend a lot of money and time in developing a type of electronic product called "external box for HDD". An external box for HDD enables a user to have an increased amount of data storage space in a quick, easy, and convenient way so as to keep up with this information explosion era. An external box for HDD is a housing made of metal or hard plastics. At least one HDD is releasably mounted in the housing. Each HDD is electrically connected to circuitry mounted in the housing such that in operation the HDD may be employed by a personal computer or a server. Also, a user can easily add a new HDD in the external box to increase data storage space without involving detaching the case of the personal computer or the server. Typically, there are two types of external box available.

(i) The first one comprises an outer housing and an inner housing. The outer housing is affixed to a personal computer or server and a HDD is contained in the inner housing. Next, mount the inner and outer housings together after inserting the inner housing into the personal computer or the server. For removing a HDD from the inner housing simply detach the inner housing from the outer housing and remove the desired HDD from the inner housing. However, the first type of external box undesirably consumes a precious internal space of the personal computer or the server. Further, only one HDD per replacement is allowed. Furthermore, it involves detaching the personal computer or the server prior to mounting the outer housing. Thus, its operation is very inconvenient.

(ii) The second one comprises a seat and a housing. Circuitry is mounted in the seat. The circuitry is electrically connected to a HDD via busses. Next, mount the housing and the seat together with the HDD, the busses, and the circuitry. The external box is electrically connected to the personal computer or the server via USB or IEEE 1394 lines. As such, in operation the HDD can be employed by the personal computer or the server. However, the second type of external box suffered from a number of disadvantages. For example, a great number of times of unplugging and plugging the busses are required in an operation of detaching a HDD from the seat. Thus, the busses are prone to breaking. Further, the seat is affixed to the HDD by means of screws. This can damage the HDD if sufficient care is not taken. Furthermore, its operation is very inconvenient.

Thus, it is desirable to provide a novel external box for HDDs having a quick release mechanism and a simple structure, and being diversified in its design in order to attract more consumers to buy and therefore overcome the inadequacies of the prior art.

SUMMARY OF THE INVENTION

After considerable research and experimentation, an external box for hard disk drives having a quick release mechanism according to the present invention has been devised so as to overcome the above drawbacks of the prior art.

It is an object of the present invention to provide an external box comprising a panel, a housing, a seat, and a body. The panel is secured to a rear of the housing. The seat is secured to a front of the housing. The body is secured to the seat. Moreover, the housing contains at least one mass storage device each adapted to connect to a corresponding port mounted on the seat. The body comprises at least one pivotal release mechanism each lined up with the mass storage device. The release mechanism is adapted to pivot to pass a channel of the seat to push the mass storage device in the housing further away from of a rear of the body for detaching the mass storage device from the external box by utilizing the principles of lever. By utilizing this external box, the purpose of quickly easily removing the mass storage device is achieved.

The above and other objects, features and advantages of the present invention will become apparent from the following detailed description taken with the accompanying drawings.

DETAILED DESCRIPTION OF THE PREFERRED EMBODIMENTS

Figure 1:
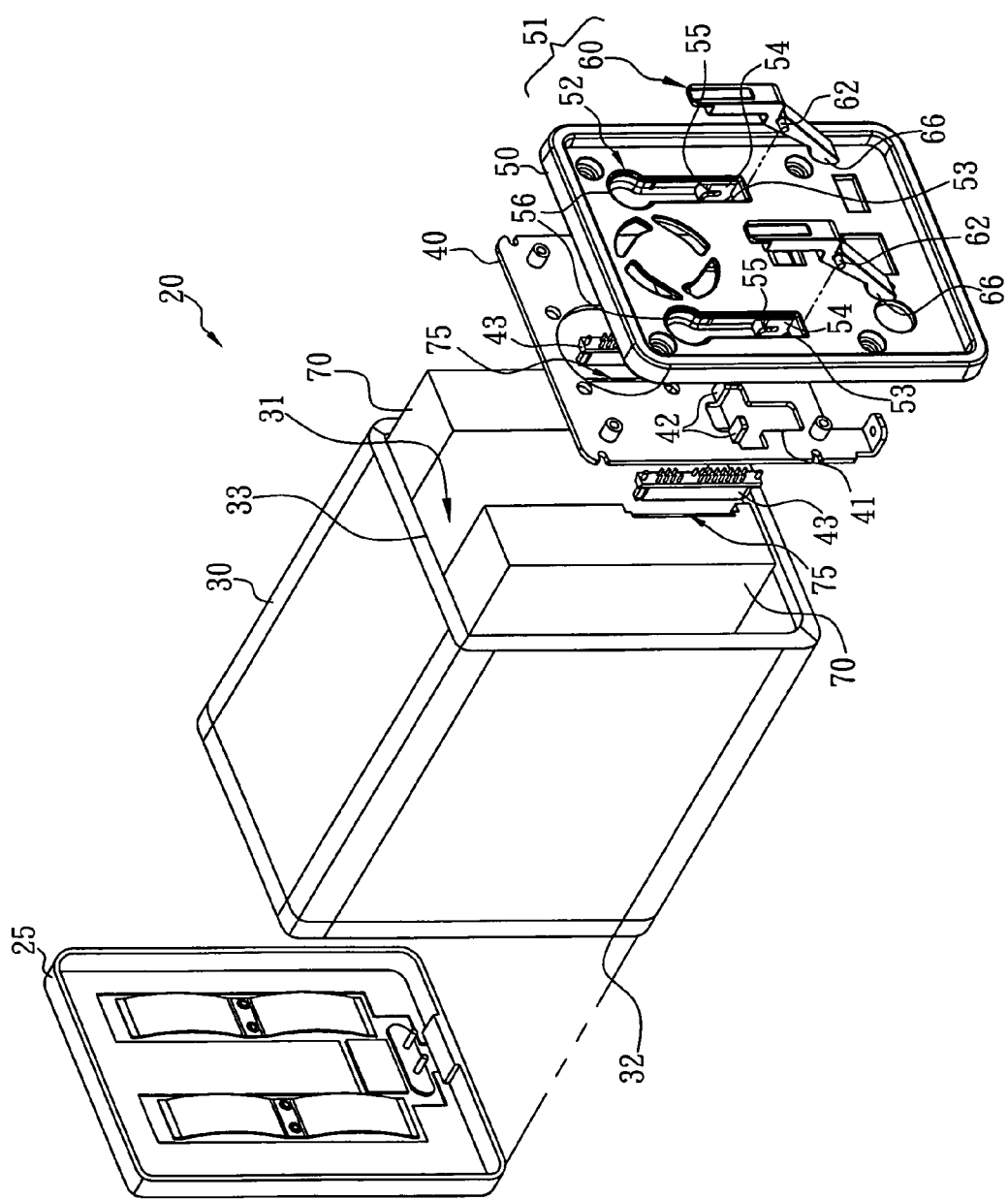
FIG. 1 is an exploded view of a preferred embodiment of external box for HDDs according to the invention.

Referring to FIG. 1, an external box 20 for HDDs having a quick release mechanism in accordance with a preferred embodiment of the invention is shown. The external box 20 comprises a panel 25, a housing 30, a seat 40, and a body 50. Each component is discussed in detailed below.

The parallelepiped housing 30 comprises an internal space 31, a rear first opening 32, and a front second opening 33 facing the first opening 32 and being in communication with the first opening 32 through the space 31 of the housing 30. The panel 25 is secured to the first opening 32 (i.e., secured to the housing 30) so as to conceal inside of the housing 30 and shield EM (electromagnetic) waves emitted therefrom. The front of the seat 40 is secured to the rear of the body 50. The rear of the seat 40 is secured to the second opening 33 of the housing 30. As a result, both the body 50 and the seat 40 are secured to the front of the housing 30 and are disposed opposite the panel 25. Further, at least one release mechanism 51 is provided on the front of the body 50 and is pivotal about the body 50. At least one mass storage device (two are shown) 70 is provided in the housing 30. The mass storage device 70 is implemented as a HDD in the embodiment. The release mechanism 51 is adapted to push the mass storage device 70 further away from of the rear of the body 50 for detaching the mass storage device 70 from the external box 20 by utilizing the principles of lever. As an end, the purpose of removing the mass storage device 70 in a quick, easy manner is achieved.

Referring to FIG. 1 again, circuitry (not shown) and at least one port 43 are provided on the back of the seat 40. A connector 75 of the mass storage device 70 is adapted to connect to the port 43 for electrically connecting to the circuitry and physically mounting the mass storage device 70 onto the back of the seat 40. A plurality of channels 41 are formed through of the seat 40 facing the release mechanism 51. As such, each release mechanism 51 is adapted to push the mass storage device 70 rearwards of the seat 40 and push same further away from the rear of the body 50 through the corresponding channel 41.

Referring to FIG. 1 again, the release mechanism 51 is comprised of a slot 52 of the body 50 and a lever 60 pivotably provided in the slot 52. A pivot member 54 is provided at either side of the slot 52 facing the front of the channel 41. An aperture 55 is provided in the front of the slot 52 in either pivot member 54. A through hole 53 is provided in the rear of the slot 52 (i.e., proximate the front of the seat 40 and distal the body 50) between the pivot members 54. Each of the levers 60 is mounted in the corresponding slot 52. A pivot pin 62 is provided at either side of the lever 60 and lines up with the corresponding pivot member 54. The pivot pins 62 of the lever 60 are pivotably mounted in the apertures 55 in the pivot members 54 of the slot 52. As such, the lever 60 is adapted to pivot in the slot 52. At the same time, one end of the lever 60 is adapted to extend into the housing 30 to be proximate the port 43 through the through hole 53 and the channel 41 because the lever 60 is pivotably provided in the slot 52. As such, the mass storage device 70 secured to the corresponding port 73 is pushed rearwards further away from the rear of the body 50 by pivoting the lever 60 by urging a bump 66 at one end of the lever 60 against the mass storage device 70 in the housing 30.

Figure 2:
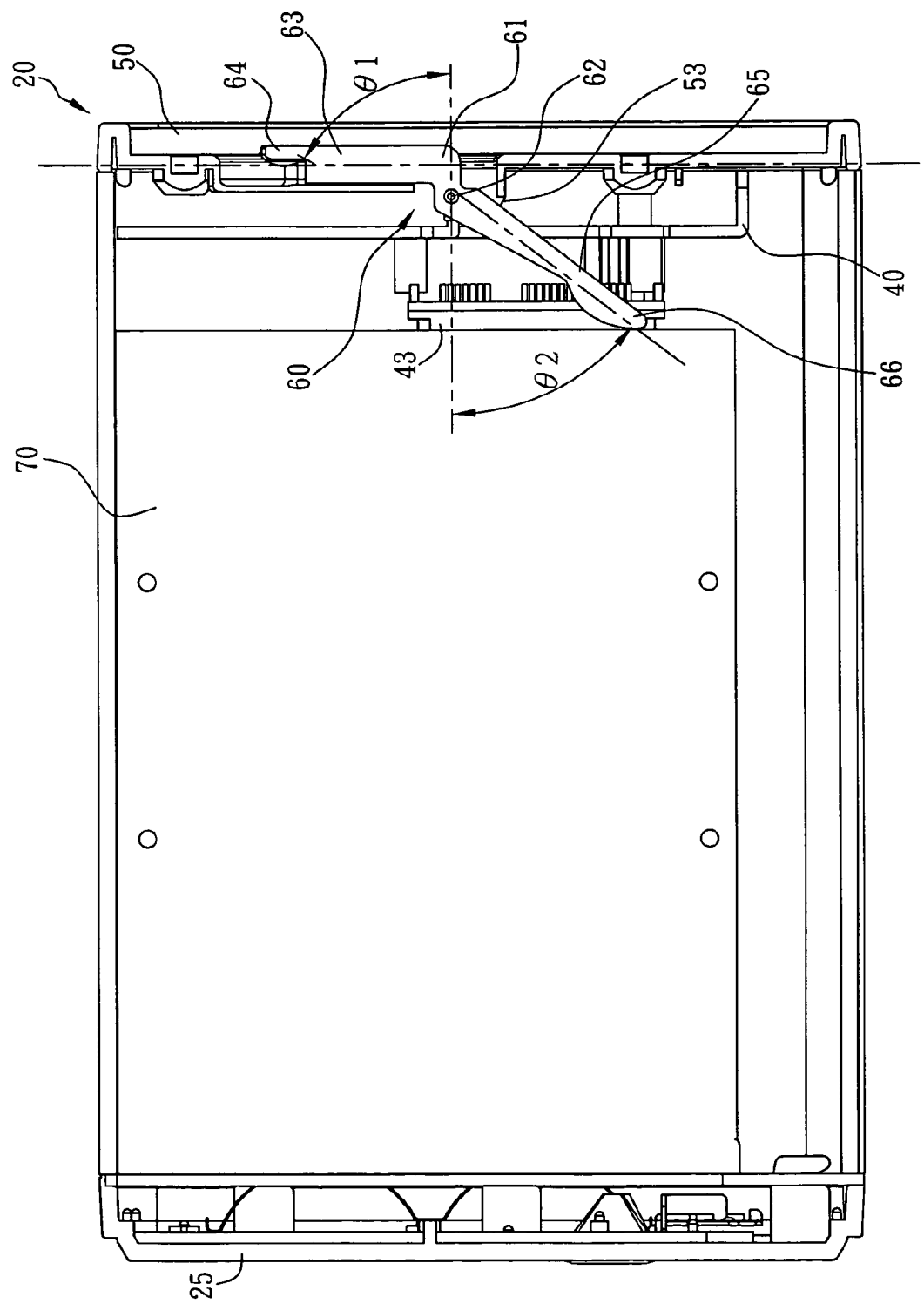
FIG. 2 is a side elevation of the external box where the lever is mounted in the slot.
Figure 3:
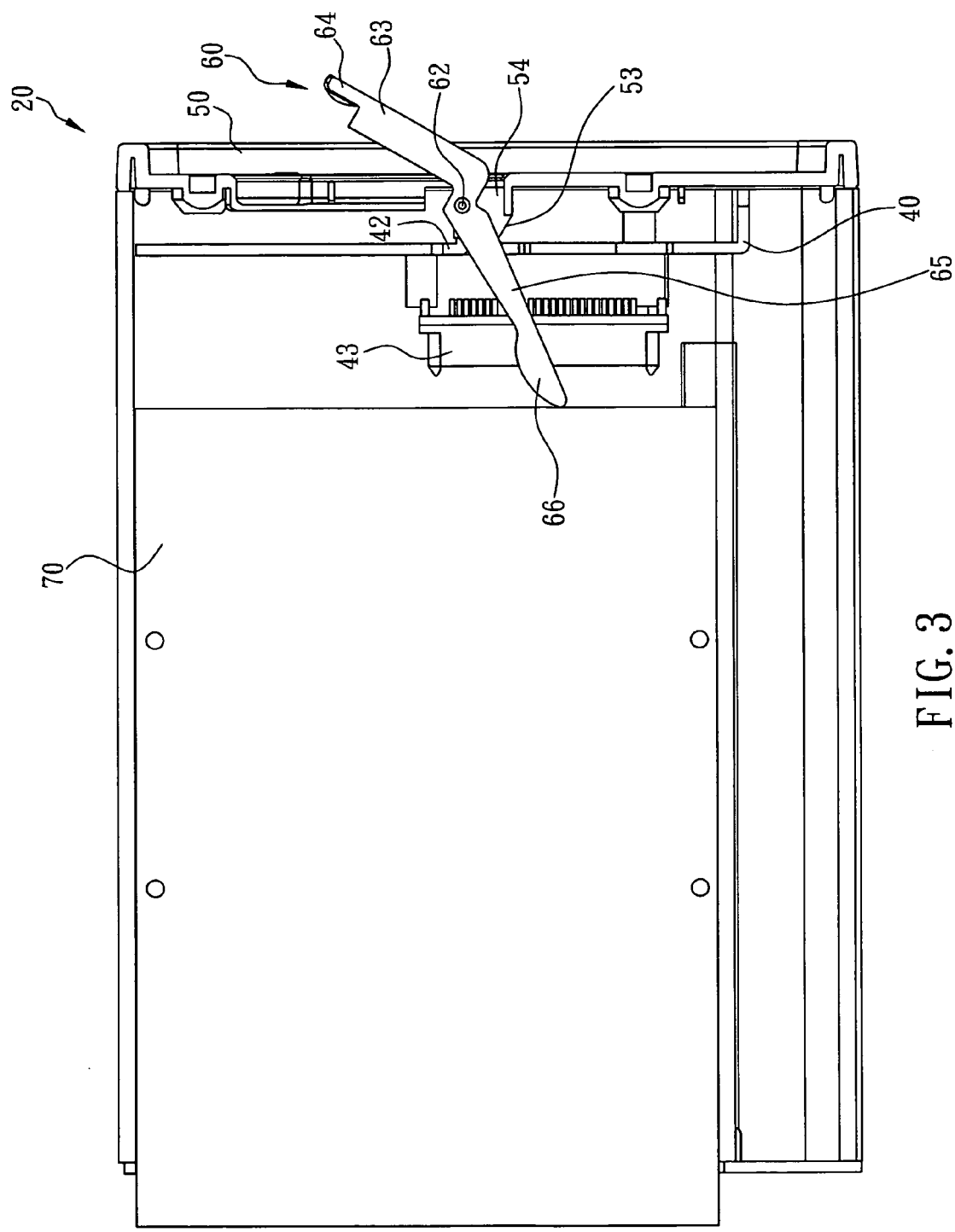
FIG. 3 is a view similar to FIG. 2 wherein the lever is pivoting.

Referring to FIGS. 2 and 3 in conjunction with FIG. 1, in the preferred embodiment of the invention the lever 60 comprises a bent connection member 61, a first extension 63 extended toward the other end, and a push member 65 extended toward one end. Two pivot pins 62 are provided at both sides of the connection member 61 (i.e., either pivot pin 62 facing the either pivot member 54). A second extension 64 at the front of the body 50 is extended from the first extension 63 away from the pivot members 54. The second extension 64 is adapted to conceal the interior of the slot 52 for being aesthetic when the lever 60 is mounted in the slot 52. Further, the finger of a user may push or pull the second extension 64 for pivoting the lever 60. One end of the first extension 63 is formed with the other end of the connection member 61 and the first extension 63 is at an angle θ1 (e.g., 90 degrees) with respect to the connection member 61.

Referring to FIG. 1 again, a groove 56 is provided on a top of each of the slots 52 distal the second extension 64. Width of the groove 56 is larger than that of the slot 52. The groove 56 is in communication with the corresponding slot 52. The groove 56 is substantially shaped as a circle for facilitating the insertion of the finger. The other end of the second extension 64 distal the second extension 64 is disposed in the groove 56 when the lever 60 is mounted in the slot 52. Thus, the finger of the user may insert into the groove 56 to push or pull the second extension 64 for pivoting the lever 60.

Referring to FIGS. 1, 2, and 3 again, the bump 66 is formed at one end of the push member 65. The other end of the push member 65 is formed with one end of the connection member 61 and the push member 65 is at an angle θ2 (e.g., in the range of 30 degrees to 60 degrees) with respect to the connection member 61. Referring to FIG. 2 again, thus the push member 65 passes the through hole 53 and the channel 41 to extend into the housing 30 when the first extension 63 is mounted in the slot 52. As a result, the bump 66 is disposed adjacent the port 43 distal the rear of the seat 40. That is, the bump 66 is provided adjacent the mass storage device 70 facing the rear of the seat 40.

Referring to FIG. 3 again, the user pulls the lever 60 to cause the first extension 63 to pivot about the pivot pins 62 of the connection member 61 (i.e., clockwise pivot the lever 60 forward out of the body 50). The push member 65 also clockwise pivots in the housing 30 to bypass the port 43 to push the mass storage device 70 rearwards by utilizing the principles of lever.

Referring to FIGS. 1 and 2 again, it is noted that preferably the channels 41 are provided on the seat 40 proximate the bottom of the external box 20. In other words, the channels 41 are provided proximate the connector 75. Preferably, the slots 52 are provided on the body 50 proximate a top of the external box 20. The rear of the slot 52 lines up with a gap between two projecting positioning members 42 on a top edge of the channel 41. While positions of the channels 41 or the slots 52 can be changed, it is within the scope of the invention as long as the slots 60 are adapted to pass the channels 41 to push the mass storage device 70 rearwards by pivoting.

Referring to FIG. 1 again, the two projecting positioning members 42 are formed on the top edge of each of the channels 41 proximate the pivot members 54. The gap between the positioning members 42 of the channel 41 is slightly larger than a width of the slot 52. Thus, portion of the slot 52 projecting from the back of the body 50 is adapted to snugly fit between the two positioning members 42. As an end, the body 50 is secured to the seat 40.

In view of the above, it is contemplated by the invention that a user can replace any mass storage device 70 mounted in an external box 20 in a quick, convenient, and easy manner by utilizing the common specifications of mass storage device 70.

While the invention herein disclosed has been described by means of specific embodiments, numerous modifications and variations could be made thereto by those skilled in the art without departing from the scope and spirit of the invention set forth in the claims.

What is claimed is:

1. An external box, comprising:
    a housing for containing at least one mass storage device and including a rear first opening and a front second opening opposite to the first opening and being in communication with the first opening through an internal space of the housing;
    a panel cover secured to the first opening;
    a panel seat secured to the second opening and including a circuitry and at least one connecting port each adapted to connect to one of the at least one mass storage device; and
    a panel having a body having a rear secured to the seat and including at least one pivotal release mechanism mounted on a front of the body and lined up with the port such that a pivoting of the at least one release mechanism will push the mass storage device connected to the port further away from the panel seat which is positioned in between the mass storage device and the rear of the body.

2. The external box of claim 1, further comprising at least one channel each formed through of the seat facing the release mechanism.

3. The external box of claim 2, wherein the release mechanism comprises a slot formed through the body and a lever pivotably mounted in the slot.

4. The external box of claim 3, further comprising a pivot member formed at either side of the slot facing a front of the channel, an aperture formed at a front of the slot in either pivot member, and a through hole formed at a rear of the slot proximate a front of the seat between the pivot members.

5. The external box of claim 4, wherein the lever comprises:
- a connection member including two pivot pins formed at both sides, each pivot pin facing the corresponding pivot member and adapted to pivotably secured to the corresponding aperture;
- a first extension having the other end formed as a second extension and one end formed with the other end of the connection member; and
- a push member having one end passed the through hole and the channel into the housing and the other end formed with the other end of the connection member, the push member including a bump formed at one end proximate the port.

6. The external box of claim 5, wherein the push member is at an oblique angle with respect to the connection member such that the push member is adapted to pass the through hole and the channel to extend into the housing for disposing the bump adjacent the port distal a rear of the seat when the first extension is mounted in the slot.

7. The external box of claim 6, wherein the first extension is at a right angle with respect to the connection member.

8. The external box of claim 7, further comprising a groove formed on a top of the slot distal the pivot members, the groove having a width larger than that of the slot and the groove being in communication with the slot.

9. The external box of claim 8, further comprising two projecting positioning members formed on a top edge of each channel proximate the pivot members, a gap between the positioning members being slightly larger than the width of the slot.

10. The external box of claim 6, wherein the oblique angle is in a range of 30 degrees to 60 degrees.

* * * * *